July 14, 1953  N. TRBOJEVICH  2,645,023

CALIPER USING DIFFERENTIAL SERIES OF GAUGE BLOCKS

Filed Nov. 1, 1947  2 Sheets-Sheet 1

INVENTOR.

Nikola Trbojevich

July 14, 1953          N. TRBOJEVICH          2,645,023

CALIPER USING DIFFERENTIAL SERIES OF GAUGE BLOCKS

Filed Nov. 1, 1947          2 Sheets-Sheet 2

| FRACTIONS | | INTEGERS |
|---|---|---|
| 1- .3001 | 5- .3081 | A- .300 |
| 2- .3003 | 6- .3243 | B- .900 |
| 3- .3009 | 7- .3729 | C- .2.700 |
| 4- .3027 | 8- .5187 | D- .8.100 | b= .300" k= .0001"

| FRACTION | x" | y" | CODE |
|---|---|---|---|
| .0001 | 1 | — | +1 |
| | 1 | 2578 | -4 |
| .0002 | 2 | 1 | 0 |
| | — | 1578 | -5 |
| .1631 | 2368 | 157 | +1 |
| | 357 | 18 | 0 |
| .1632 | 2368 | 57 | +2 |
| | 357 | 8 | +1 |

| INTEG. | CODE NUMBERS | | | | | |
|---|---|---|---|---|---|---|
| | 0 | | +1 | | +2 | |
| | x' | y' | x' | y' | x' | y' |
| .000 | — | — | — | A | A | B |
| .300 | A | — | — | — | — | A |
| 7.800 | D | A | AD | B | D | B |
| 8.100 | D | — | D | A | AD | B |
| 8.400 | AD | — | D | — | D | A |
| 8.700 | BD | A | AD | — | D | — |

INVENTOR.

*Nikola Trbojevich*

Patented July 14, 1953

2,645,023

UNITED STATES PATENT OFFICE 2,645,023

CALIPER USING DIFFERENTIAL SERIES OF GAUGE BLOCKS

Nikola Trbojevich, Detroit, Mich.

Application November 1, 1947, Serial No. 783,482

8 Claims. (Cl. 33—168)

The invention relates to an improvement in precision gauges and calipers.

In particular, this application may be considered as a continuation-in-part of my two prior and copending applications, viz: Serial No. 545,990, filed June 21, 1944 "Gauges," abandoned February 27, 1950, and Serial No. 579,789, filed February 26, 1945, "Angle Measuring Bar and Gauges," now Patent No. 2,446,562, issued August 10, 1948. A reference is further being made to a third copending application, Serial No. 725,999, filed February 3, 1947, "Precision Weights and Balance," abandoned January 12, 1952, in which certain mathematical deductions pertaining to this novel system of differential measurement are found.

The object is to construct a caliper-like measuring tool capable of measuring both male and female distances, i. e. externally and internally with an extreme accuracy.

Another object is to construct a tool of the indicated type in the form of an assembly of interchangeable measuring blocks of the adhering or Swedish type.

A further object is to obtain numerous combinations by using only relatively few measuring blocks.

Another object is to construct a caliper of the indicated type in which the gauge blocks are enclosed at all sides and protected from damage by means of replaceable auxiliary members.

A further object is to employ two L-shaped projecting plates or jaws of such a form that they may be used either for male or female measurement by means of a simple transposition and are further capable of nesting in each other whereby small male and female distances may be measured.

Still another object is to employ measuring and auxiliary blocks of a much heavier cross section than was formerly possible without sacrificing the lower ranges of measurement thereby.

Another object is to furnish a set of measuring blocks which may be used for various purposes in a differential manner, e. g. in connection with sine or angle rectifying bars according to the teachings of my application, Serial No. 579,789.

A further object is to reduce the cost and increase the accuracy of precision distance measurement.

These and other objects will now be more fully explained.

Figure 1:
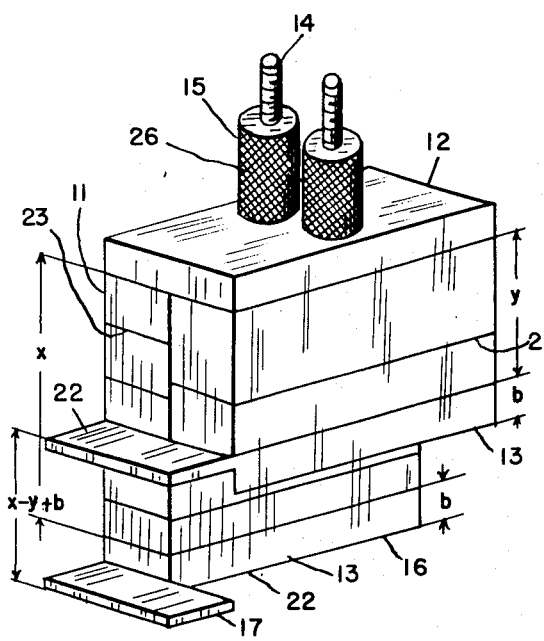
Figure 1 shows the new caliper adapted to take a male or external type of measurement, in elevation and perspective.

As shown in Figure 1, the new caliper is an assembly formed from a plurality of parallelepipedal measuring blocks 11 stacked in two columns of unequal heights $x$ and $y$ respectively, side by side beneath a top plate 12 and covered at their lowermost faces by means of two L-shaped projecting pieces 13. The arrangement of the said projecting pieces 13 is such that their short shanks 17 face each other in a substantial registry over the entire width of the device.

The contacting planes in the said parts are all strictly parallel and finished to such an extent that they will adhere to each and form a solid prismatic body in the manner of the well known Swedish blocks when rubbed together. The screws 14 and the nuts 15 are furnished merely as a protective device against the accidental falling apart of the component pieces but they do not take part in or affect the accuracy of the measurement.

Figure 2A:
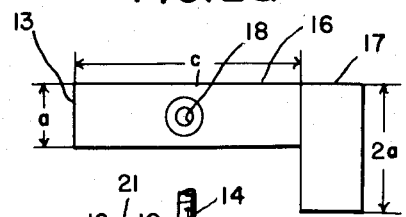
Figures 2a and 2b are two views of the L block used in this appliance.
Figures 2B, 3B:
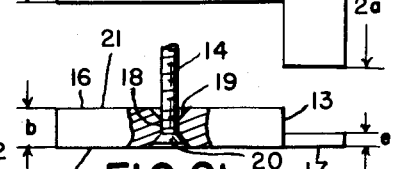
Figures 3a and 3b are two views of the measuring block.

In Figures 2a and 2b the formation of the L-shaped projecting block is shown. The long shank 16 is of a preselected width $a$ and length $c$ corresponding to the similar dimensions found in the gauge block 11. The thickness $b$ is exact and corresponds to the thickness of the unit measuring block. The short shank 17 extends at right angles from the said shank 16 integrally therewith and its length is selected as twice the width of the said first shank. Its thickness $e$ is less than the said thickness $b$, whereby when two such blocks are brought in a juxtaposite position to form an external type of measuring tool as in Figure 1, they are capable of nesting in each other whereby the minimum distance which can be measured is materially reduced, or, conversely, whereby the thickness $b$ may be increased without the disadvantage of increasing the minimum measurable distance, which is a distinct advantage inherent in this system.

In the midpoint of the said shank 16 a hole 18 is formed, the said hole being provided at its two opposite ends with corresponding conical counterbores 19, as indicated in the drawing. The screw 14 is provided with a conical head 20 at its lower end, which head snugly fits therein and also provides a bottom clearance to avoid interference with the adjacent measuring plane 22. The said L gauge 13 is accurately finished in exact parallelism at its two opposing sides 21 and 22 while the upper portion of the shank 17 may remain unfinished.

Figure 3A:
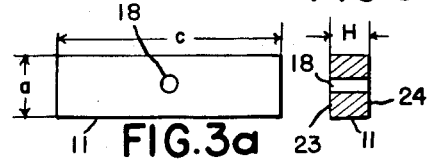

In Figures 3a and 3b a measuring block 11 is shown. This is a parallelepiped having a length c and a width a as already mentioned, while its thickness H determined by the two strictly parallel measuring planes 23 and 24 respectively is variable and its exact numerical values for each block may be found in Figure 6. The said block is further provided with a centrally located hole 18 as shown.

Figures 4A, 4B:
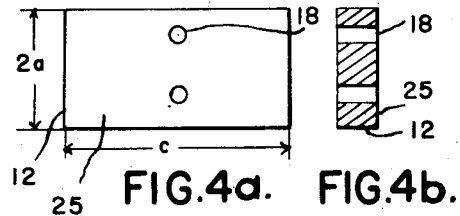
Figures 4a and 4b are two views of the end plate 12.

In Figures 4a and 4b the top plate 12 is shown in two projections. The said plate is twice as wide as the aforementioned shank 16 and the block 11 and is provided with two holes 18, as shown. Only one measuring plane 25 (the side which contacts the blocks 11 in Figures 1 and 5) needs to be finished. Its thickness may be selected within reasonable limits, at will.

Figures 5, 6, 7, 8:
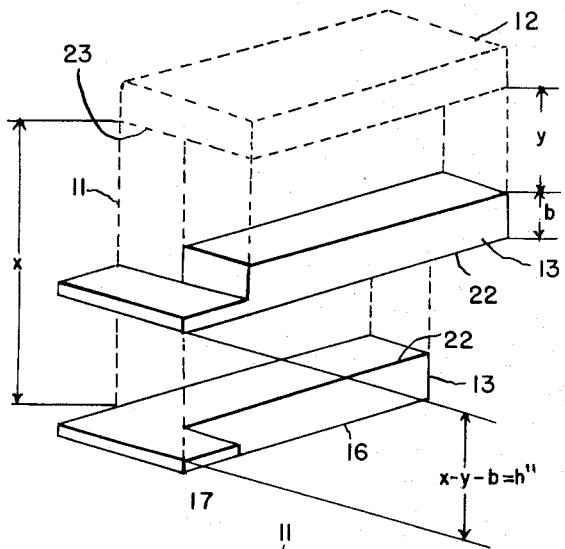
Figure 5 is a modification of Figure 1 in which the L-shaped members are rearranged to form a female or internal type of measurement.
Figure 6 is a diagram showing a set of twelve measuring blocks.
Figures 7 and 8 are fragmentary views of two pages of the book of instruction and explanatory of the method of forming block combinations.

Figure 5 is a diagram similar to Figure 1 in all respects except that the two L-shaped pieces 13 are turned around to face each other with their long measuring planes 22 and thereby furnish an exact measurement between the said two planes. In contra-distinction therewith, Figure 1 shows an arrangement in which the said measuring planes 22 are turned away from each other, i. e. they are facing outwardly corresponding to the opposite type of measurement. It follows from inspecting the said two arrangements and by denoting with $h'$ the external and with $h''$ the internal type distance to be constructed that:

$$h' = x - y + b \quad (1)$$
$$h'' = x - y - b \quad (2)$$

and, $$x - y = h' - b = h'' + b \quad (3)$$

in which $x$ and $y$ are the respective lengths of the positive and negative measuring block stacks and $b$ is the thickness of the L-shaped gauge, as already mentioned.

The minimum distances which can be constructed $h'_{min}$ and $h''_{min}$, external and internal, are:

$$h'_{min} = 2e \quad (4)$$
$$h''_{min} = 0 \quad (5)$$

The nuts 15, Figure 1, are provided with knurlings 26 at their outer circumferences to indicate that only finger pressure and not perhaps a wrench should be used in tightening the same. The screws 14 are furnished with each set in various lengths and in sufficient numbers corresponding to the range of the caliper.

In Figure 6 a box 27 containing twelve measuring blocks 11 forming a typical set is diagrammatically shown. The said blocks form two series, viz: an integral series comprising four blocks and a fraction series comprising eight blocks. The integral blocks are numbered with capital letters A to D inclusive, while the fractions are numbered with arabics 1 to 8 inclusive. The thickness H in inches, which is different for each block, also may be stamped in as shown. A set of this kind for $e = .100''$, see Figure 2b, is capable of furnishing all combinations in .0001'' steps from .200'' to 12'' in external and from 0 to 12'' in internal types of measuring distances. The $x$ and $y$ block combinations for any particular measurement are either determined mathematically by the operator or, more conveniently, are obtained from the book of instruction furnished with the set. The blocks shown in Figure 6 may also be used for measuring angles in connection with a sine bar or a radian bar as was explained in the mentioned application, Serial No. 579,789.

In Figures 7 and 8 two pages of the said book of instruction are fragmentarily shown. Figure 7 relates to the fraction blocks 1 to 8 inclusive and Figure 8 relates to the integral blocks A to D inclusive. The integral series can be extended outwardly without affecting the fractional series at will and, in such a case, each additional block multiplies the previous maximum range and the number of combinations by three.

The mathematical procedure of determining the block thicknesses H and of computing the combinations $x$ and $y$, Figures 7 and 8, will now be briefly explained.

It is believed that the inventor was the first to initiate an accurate method of measuring angles, distances and weights by means of a specific differential system. In angle measurement, see Patent No. 2,134,062 of October 25, 1938, the blocks were arranged in a single geometrical series having only one constant. However, for the measurement of weights and distances, the one-constant scheme would not work for the simple reason that while it is possible to construct an angle block having an angle of, say, one second, one cannot make a measuring block .0001'' thick or a weight equal to a small fraction of a milligram. Hence, I conceived the idea of forming the blocks in two series based upon two constants in such a manner that the first or the integral series is a simple geometric series, while the second series is a compound one comprising both constants. By this means it is now possible to compose the fractional part of a desired distance or number by means of the second or compound series and then apply a correction in the first series by means of the integral elements contained in the second series. This is the basis of my invention. By this means the number of blocks required to cover a given range is enormously reduced (from former 82 blocks down to 12), the blocks may be made thicker, stronger, and therefore more accurate than prior to this invention and very small distances, especially in the internal type modification, Figure 5, may be accurately measured.

Another advantage of employing two series and two constants in the construction of a set of measuring blocks is that each distance may be constructed in two fundamentally different block combinations, i. e. a direct and a complementary combination. One usually chooses to use the simpler one of the two, but, in some instances, one may use both combinations, one after the other, for the purpose of checking the accuracy of the gauges.

In forming the said two series, I first form the integral series S':

$$S' = b + 3b + 9b + 27b \quad (6)$$

in which, for $b = .300$ the series becomes in inches:

$$S' = .300 + .900 + 2.700 + 8.100 \quad (7)$$

The compound or fraction series S'' is next formed on the basis of the said constant b and another constant $k$ which corresponds to the unit spacing, in this case $k=.0001''$. Thus:

$$S''=(b+k)+(b+3k)+(b+9k) \quad (8)$$
$$+ \ldots +(b+3^{n-1}k)$$

Or, numerically:

$$S''=.3001+.3003+.3009+ \ldots +.5187 \quad (9)$$

for eight blocks, 1 to 8 inclusive, Figure 6.

The number of blocks in the last series is such that the sum of the fractional members, i. e. the members containing the factor $k$ is equal to or greater than the constant $b$. For eight blocks, the said sum is equal to .328 which is greater than $b=.300$ and therefore, satisfactory.

The method of forming any desired block combination will now be explained. Let the fractional part of the ultimate combination $x$—$y$ be denoted with $x''$—$y''$. Then:

$$x''-y''=ab+\beta k \quad (11)$$

will be the general form of the partial combination in which both $\alpha$ and $\beta$ are integers. This is important. I term the first constant $\alpha$ as the "code number," see Figures 7 and 8. In Figure 7, the code number in the first or direct row of combinations is equal to the difference in digits in the columns $x''$ and $y''$ respectively. In the second or complementary line of combinations, the code number is equal to the momentary digit difference less one. This peculiarity will be further explained.

The correction in the integral series for the excess or deficiency in length of the partial columns $x''$—$y''$ is now accomplishable because the correction is always an integral multiple of the first constant $b$. Thus, the corrected integral partial combination, denoted with the symbols $x'$—$y'$ will be of the general form:

$$x'-y'=(\gamma-\alpha)bQED \quad (12)$$

in which both $\gamma$ and $\alpha$ are integers and their difference is also an integer.

The Equations 1, 2 and 3 show that the total combination $x$—$y$ differs from the distances $h'$ and $h''$ to be measured due to the effect of the thickness $b$ of the L block. The value of the total combination $x$—$y$ for external or internal distances $h'$ and $h''$ is therefore first determined from the Equation 3 which shows that for the first distance the value of $b$ must be subtracted from and for the second, added to the nominal distance. In other words, a certain block combination $x$—$y$ having the numerical value of, say, 5 inches will measure after the addition of the L members 5.3" in external modification, Figure 1, and 4.7" in internal modification, Figure 5.

I shall now show the method by which the secondary or complementary combinations $x''$—$y''$, see the second line in each division, Figure 7, are obtained. Let there be a certain partial fractional combination of a value, say:

$$x''-y''=ab+.1630 \quad (13)$$

I now form another combination of the form $$y''-x''=a'b+.2370 \quad (14)$$

Note that the sum of the two decimal fractions at the right side of the equations is equal to $.300=b$. The unknown code number $a'$ in the second equation may now be determined from the Equations 13 and 14. By adding the two equations, I have:

$$0=(a+a')b+b \quad (15)$$

Or, $$a'=-(a+1)QED \quad (16)$$

Thus, the complementary code number must be made by one smaller than it would be in a similar primary or direct combination. E. g. in Figure 7, let the fraction to be studied be .1632. The primary combination is (2, 3, 6, 8) — (5, 7). The code number is equal to 2, i. e. the difference in the number of digits in the first and second columns, $x''$ and $y''$. The complementary combination corresponding to the same fraction is equal to: (3, 5, 7) — (8). The digit difference is equal to 2, but in view of the Equation 16, the correct code number is equal to $2-1=1$.

The method of calculating the block combinations $x''$ and $y''$, Figure 7, and $x'$—$y'$ combinations, Figure 8, will now be discussed. Theoretically, any combination based on the progressive powers of three may be found by calculation. It can be shown that any and all such combinations exist in the range extending from 1 to the sum of the series. I discovered that if the combinations are written down seriatim from 1 to 3000, corresponding to the fraction series Figure 7, a certain regularity in the appearance and disappearance of various block numbers is observable resulting in the fact that the combinations may all be written down by a certain method of counting, i. e. without a mathematical calculation. The complementary combinations are similarly simply found by copying the primary combinations in the reverse order and by exchanging the relative roles of the $x''$ and $y''$ members as indicated in the Equations 13 and 14. All this has been fully described in my mentioned application, Serial No. 725,999 and will not be repeated here further for lack of space.

The integral table, Figure 8, is of a much simpler construction than the said fractional table, Figure 7, in that the steps between the consecutive lines are greater and the number of blocks is smaller than in the first instance. The successive columns $x'$ and $y'$ corresponding to the increasing code numbers 1, 2, etc., are merely repetitions of the first or 0 column, downwardly shifted one line for each consecutive code number.

Hence, the procedure of finding a total combination consists of finding the two partial combinations in Figures 7 and 8 and in adding them together. The code number found in the first table forms the connecting link between the said two tables. Obviously, a single table could be constructed to cover all the combinations, but it is believed that such a large book would be too costly to prepare.

In conclusion, I shall solve a numerical example illustrating the method of calculating the block combinations for any given distance, internal or external.

*Example.*—Find the $x$—$y$ blocks, Figure 5, to furnish $h''=7.9632$, internal measure. From the said figure, I copy:

$$7.9632=x-y-.300 \quad (17)$$
$$x-y=8.2632 \quad (18)$$

I now resolve the last number into a sum of two components, viz: an "integral" part containing an integral multiple of $b$ and a remainder:

$$8.2632=8.100+.1632 \quad (19)$$

The combination for the decimal fraction .1632 is first found in Figure 7, last line:

$$x''-y''=(3, 5, 7)-(8) \quad (20)$$

Code number one. Under this code number and the "integer" 8.100 in Figure 8, I find that the combination is:

$$x'-y'=(D)-(A) \quad (21)$$

Hence, the total combination is $$x-y=(3, 5, 7, D)-(8, A) \; QED \quad (22)$$

and the caliper is readily assembled according to the plan shown in Figure 5.

To illustrate the correctness of the above solution, I shall check over the last equation from the data found in Figure 6. Ordinarily, such a check should not be necessary in practical work because the tables are supposed to be free from errors.

$$x=(3, 5, 7, D)$$
3—.3009
5—.3081
7—.3729
D—8.1000

$x=9.0819$
$y=(8, A)$
8—.5187
A—.300

$y=.8187$ $$x-y=9.0819-.8187=8.2632 \quad (23)$$
$$h''=x-y-.300=7.9632 \, QED \quad (24)$$

What I claim as my invention is:

1. A measuring device comprising a top plate, two L-shaped projecting members, a set of gauge blocks not exceeding twelve pieces and means for fastening two preselected block stacks side by side upon the said plate and members, in which the thicknesses of the said blocks form two series of the $b$ and $b+k$ type, in which $b$ in the first series and $k$ in the second series form respective geometrical progressions, in which the thickness of the L members is exactly equal to $b$ and the short legs of the said members protrude one above the other whereby both inside and outside measurements may be taken by the same device.

2. A device as described in claim 1 in which the blocks and L members are provided with one hole each, the plate with two holes, in which the fastening means are two screws and nuts, in which the blocks are parallelepipedal and the short legs of the said L members overlap the said stacks, the plate and each other.

3. A device as described in claim 1 in which the geometric progressions correspond to successive integral powers of three.

4. A device as described in claim 1 in which the sum of the $b$ series corresponds to the range of the instrument and the sum of the $k$ members in the $b+k$ series is greater than $$\frac{b}{2}.$$

5. A device as described in claim 1 in which the blocks are oblong parallelepipeds having lengths substantially greater than twice their widths, in which the plate is of the same length as the blocks and twice as wide as the said blocks, whereby a compact and easily portable instrument is obtained.

6. A device as described in claim 1 in which the short legs of the L members are gouged out and reduced in thickness for the purpose of enabling the said members to nest in each other when constructing small distances of the external type.

7. A device as described in claim 1 in which the blocks of the $b$ series are numbered with capital letters and those of the $b+k$ series with arabic numerals whereby the construction of the combination tables is simplified and the operator may construct various internal or external caliper settings without the knowledge of the exact block thicknesses.

8. A device as described in claim 1 in which the two block stacks are tightened by means of screws and in which the minimum block thickness $b$ exceeds one-quarter inch for the purpose of preventing any measurable bending of blocks when the screws are tightened by means of finger pressure.

NIKOLA TRBOJEVICH.

References Cited in the file of this patent

UNITED STATES PATENTS

| Number | Name | Date |
| --- | --- | --- |
| 1,491,100 | Hoke | Apr. 22, 1924 |
| 2,134,062 | Trbojevich | Oct. 25, 1938 |
| 2,446,562 | Trbojevich | Aug. 10, 1948 |

FOREIGN PATENTS

| Number | Country | Date |
| --- | --- | --- |
| 116,900 | Australia | Apr. 27, 1943 |
| 119,541 | Great Britain | Oct. 7, 1918 |
| 383,965 | Germany | Oct. 20, 1923 |
| 559,748 | Great Britain | Mar. 3, 1944 |

OTHER REFERENCES

Johansson Gage Block, Catalog, pp. 24–30 (1938).